Nov. 2, 1965  R. C. WOODWARD, JR  3,215,878
BRUSHLESS ALTERNATOR

Filed Dec. 26, 1961  3 Sheets-Sheet 1

INVENTOR.
RICHARD C. WOODWARD, JR.
BY
Flam and Flam
ATTORNEYS.

INVENTOR.
RICHARD C. WOODWARD, JR.
BY
Flam and Flam
ATTORNEYS.

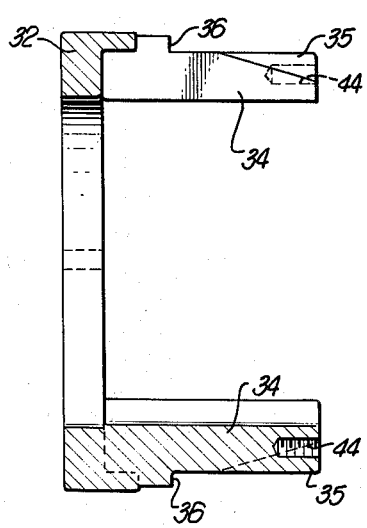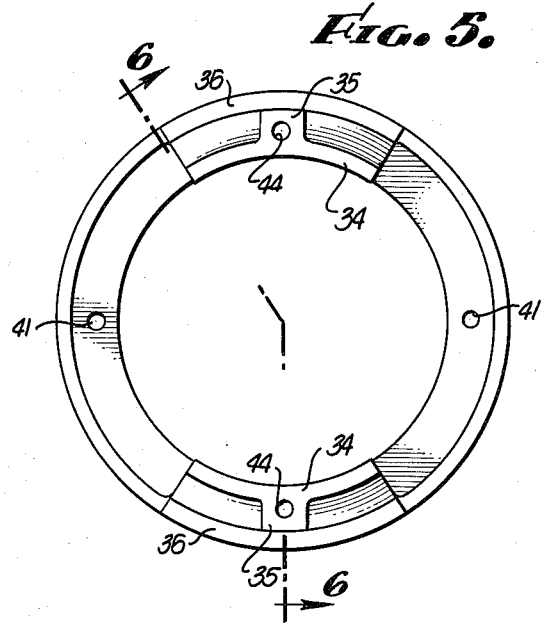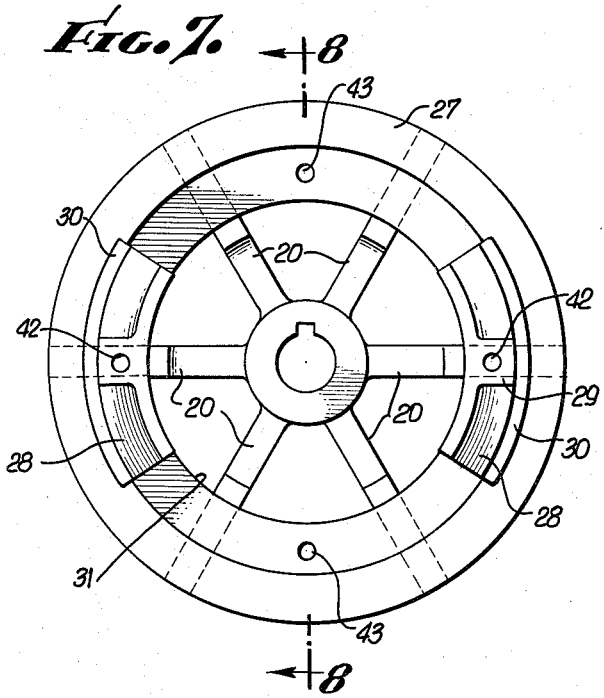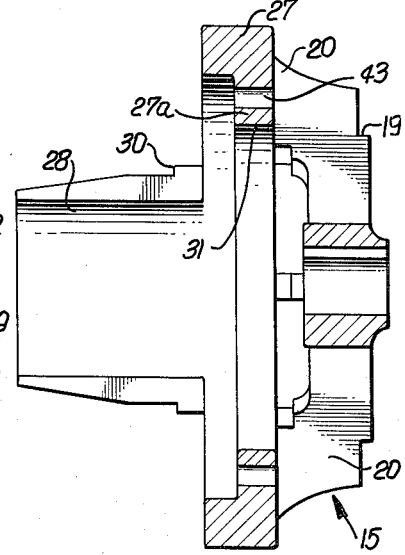

United States Patent Office 3,215,878
Patented Nov. 2, 1965

3,215,878
BRUSHLESS ALTERNATOR
Richard C. Woodward, Jr., Fullerton, Calif., assignor, by mesne assignments, to Emerson Electric Co., a corporation of Missouri
Filed Dec. 26, 1961, Ser. No. 161,801
6 Claims. (Cl. 310—168)

This invention relates to dynamo-electric machinery, and particularly to alternators.

In conventional alternators, there is a stator or primary winding, and a rotary field structure; this structure usually includes salient pole pieces having windings that are energized by direct current. As the resultant magnetic poles sweep across the stator windings, an electromotive force is generated in these windings.

In such conventional structures, collector rings and brushes are used to conduct electrical energy to the field windings. These rings and brushes are subject to wear; and often sparks are emitted that may produce a dangerous condition in the environs of the alternator.

While designs of alternators are known in which the collector rings and brushes are obviated, these designs result in some inefficiency in operation.

It is one of the objects of this invention to provide a brushless alternator that is simple in design, and satisfactorily efficient in operation.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIG. 5 is an end view of the left-hand pole piece structure;

FIG. 6 is a sectional view taken along a plane corresponding to line 6—6 of FIG. 5;

FIG. 7 is an end view of the right-hand pole piece structure; and

FIG. 8 is a sectional view, taken along a plane corresponding to line 8—8 of FIG. 7.

Figure 1:
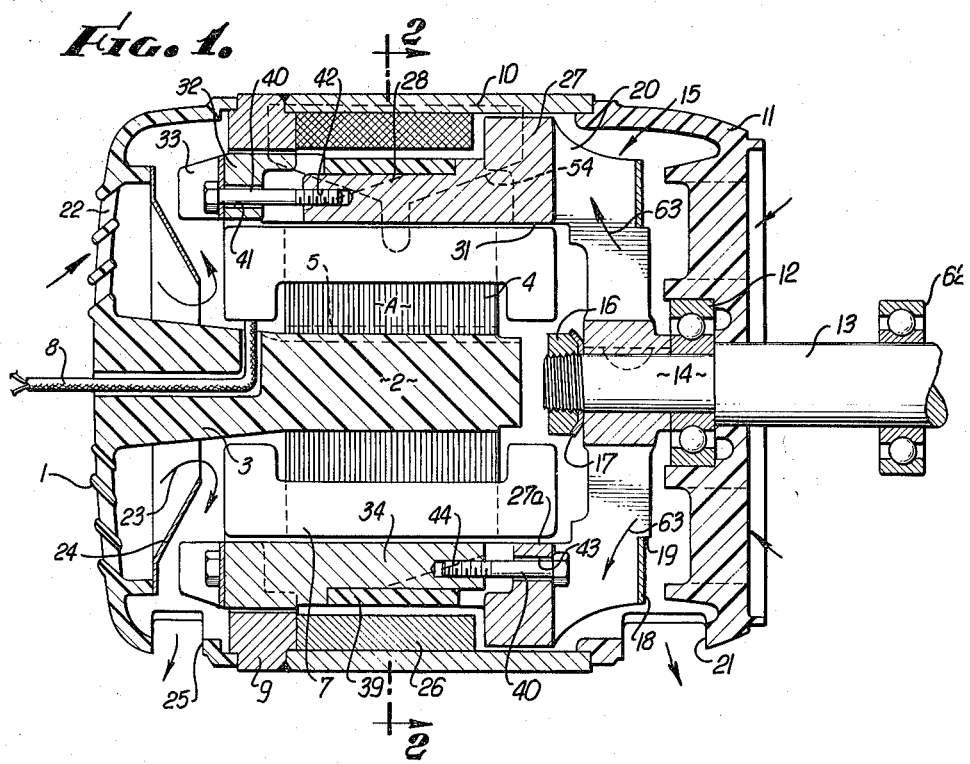
FIGURE 1 is a longitudinal sectional view of a dynamo-electric machine incorporating the invention, and taken along the plane corresponding to line 1—1 of FIG. 2.
Figure 2:
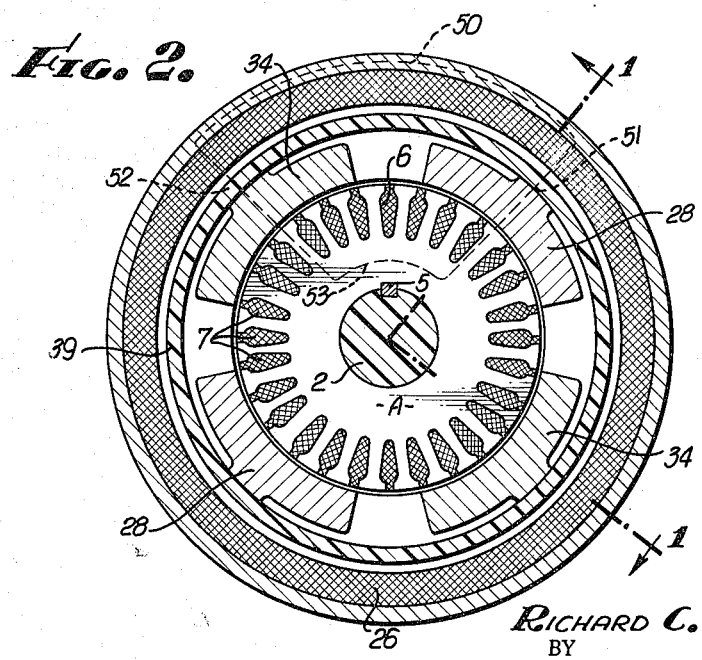
FIG. 2 is a sectional view taken along a plane corresponding to line 2—2 of FIG. 1.

In the form of the invention shown in FIGS. 1 and 2 an end bracket 1 made of non-magnetic material supports a stator structure A. In order to provide this support an arbor 2 is integrally formed with the end bracket 1, and joined thereto as by a conical base portion 3. Keyed, as by key 5 (FIG. 2), to the arbor is a stack of laminations 4, forming the core of the stator structure.

The laminations are provided with slots 6, as shown in FIG. 2, in which are accommodated the usual type of single or multiphase primary windings 7. These primary windings 7 are appropriately formed so as to provide the proper number of poles desired for the alternator. Leads 8 extend through an opening in arbor 2 for external connection of the windings 7.

The end bracket 1 is joined to a ring 9 to which is welded a tubular casing member 10. The ring 9 and the casing member 10 are made from magnetic material.

The right-hand bracket 11, made of non-magnetic material, serves to support a ball bearing structure 12 for rotatably supporting the input shaft 13. An outboard bearing 62 supplements the support. Input shaft 13 has a reduced portion 14 upon which the inner race of the bearing structure 12 is mounted. Adjacent the inner race is a spider 15 which is keyed to the extension 14.

In order to hold the rotary spider structure 15 in place, a nut 16 is provided having a lock washer 17. The nut is threaded on the left-hand threaded end of extension 14.

A thin annular ring 18 is mounted on a shoulder 19 formed upon the arms 20 of spider 15 (FIGS. 7 and 8). This thin disc 18 serves to provide a passage for ventilating air that passes outwardly from the inside of annular disc 18, and between the arms 20 through the openings 21 distributed around the bracket 11. The arms 20 induce air flow as indicated by arrows 63. This bracket 11 is joined to the right-hand end of the casing member 10.

The bracket 1 also has openings 22 for the passage of cooling air indicated by the arrows 23 past a deflector 24 and out through the openings 25 formed in bracket 1. Some air may pass longitudinally of the casing for cooling the other parts located around the stator structure A.

A magnetizing coil 26 is disposed annularly about the axis of the stator structure. A wide air gap is formed between the ring 9 and the stator structure. A relatively narrow air gap is formed between the casing 10 and the magnetic flange 27 integrally formed with the spider 15 (FIG. 8). This flange has a narrow inner projection 27a. The flange 27 has integrally joined with it two arms 28 diametrically opposite each other. Each arm 28 is of arcuate form, having a center on the axis of stator A. Its outer convex surface is provided with a central boss 29. At the base of each arm 28 is a vertical shoulder 30. The inner edge 31 of the ring 27 forms a narrow air gap with the stator structure A. The inner faces of the arms 28 form arcuate polar areas that extend quite closely to the periphery of the stator structure.

At the left-hand end of the apparatus a ring 32 of magnetic material is supported for rotation with ring 27 in a manner to be later described. It forms a small air gap with the ring 9. This ring 32 is provided with fan blades 33 and is likewise provided with diametrically opposite arms 34 (FIGS. 5 and 6) forming arcuate pole pieces. These arms are shaped identically with the arms 28 of the ring at the right-hand end of the machine. The arms of the end ring interleave but they do not extend all the way to the opposite ring. The outer convex surface of each arm is provided with a central boss or projection 35, as well as an annular shoulder 36 facing the shoulder 30 formed on the arms 28.

These shoulders serve to hold a non-magnetic spacer ring 39 in place.

The ring 32 is fastened to the ring 27, so that the rings may rotate in unison. For this purpose, four screws 40 are used. Two of these screws pass through appropriate apertures 41 (FIG. 5) in ring 32 and engage the threaded apertures 42 in the bosses 29.

Similarly, two screws 40 pass through appropriate apertures 43 in the flange 27 and engage threaded apertures 44 in the bosses 35 of ring 32.

All four of the arms 28 and 34 are made of magnetic material and are in quadrature with each other. They form alternate polar areas which sweep over the periphery of the stack of laminations 4 and thereby induce an electromotive force in the windings 7.

The polar portions 28 and 34 form arms that interleave with each other but do not completely bridge the space between the magnetic rings 27 and 32.

The magnetic circuit through the rotor and stator for one pair of poles is shown in dotted lines in FIG. 2. The arcuate portion 50 of the magnetic circuit extends through the casing 10. The radial portions 51 and 52 extend inwardly through rings 9 and 27, the polar elements 28 and 34, into the laminations 4 and join with the inner arcuate portion 53 in the laminations.

The dotted line 54 of FIG. 1 indicates the path of the flux through coil 26.

Figure 3:
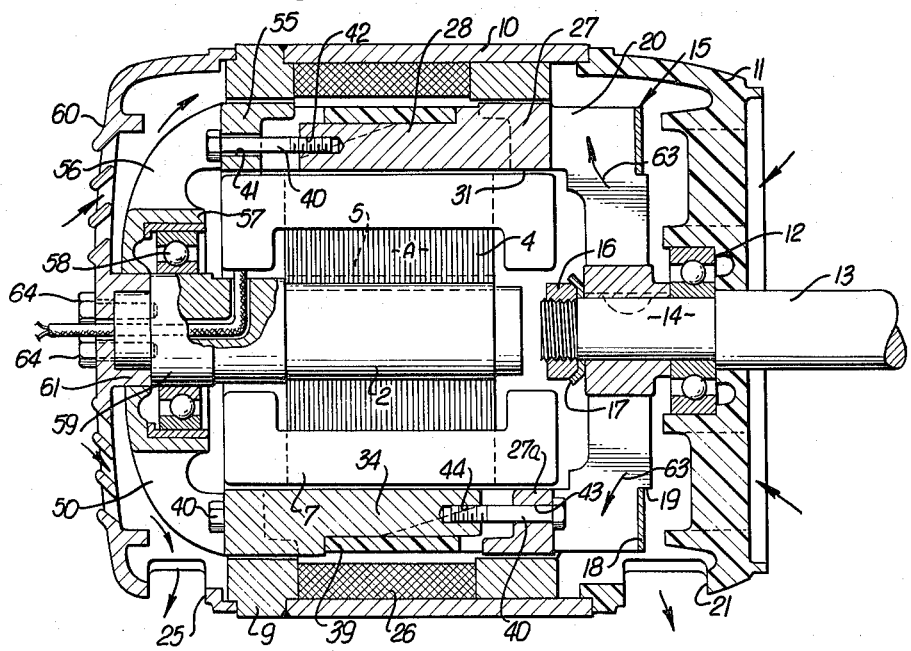
FIG. 3 is a view similar to FIG. 1 of a modified form of the invention.
Figure 4:
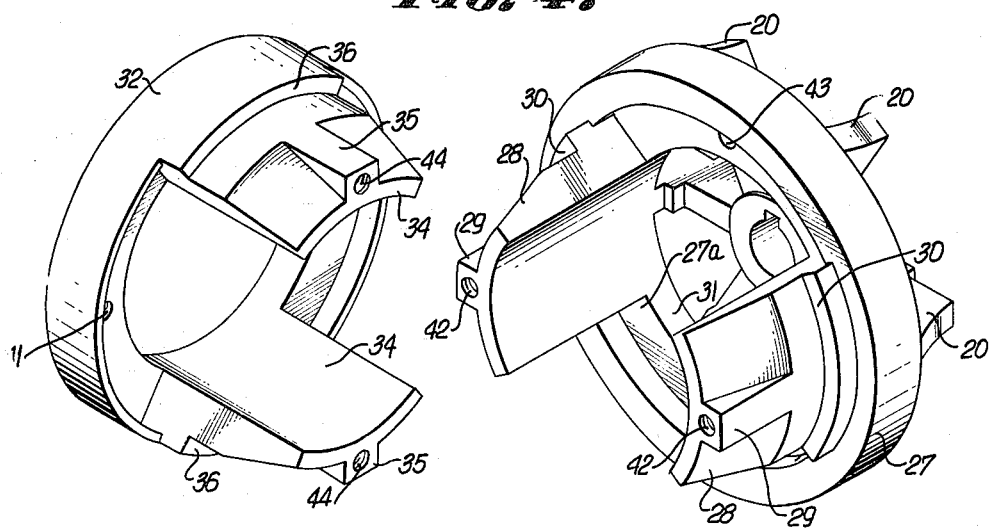
FIG. 4 is a perspective exploded view of the pole piece structures used in the machine.

The form shown in FIG. 3, except for the left-hand portion, is identical with that shown in FIG. 1. The driving shaft 13 for the polar arms is arranged as before.

The left-hand magnetic ring 55 is connected integrally with arms 56 to a hub 57. This hub 57 accommodates ball bearing structure 58. The inner race of this ball bearing structure is mounted on a mandrel or arbor 59 upon which a stack of laminations 4 is mounted. The left-hand end of the arbor 59 is supported in the bracket 60 that has a hollow boss 61 for the accommodation of the reduced left-hand end of the arbor 59. Screws 64 hold the arbor in place. In this way, the rotary pole structure is mounted for rotation by aid of bearings at each end of the machine.

In this form of the invention it is unnecessary to provide an outboard bearing, such as the bearing 62 shown in FIG. 1, for the drive shaft 13. The arms 56 induce air currents through the bracket 60.

I claim:

1. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; and a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby.

2. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby; and means carried by said one bracket rotatably supporting the other of said rotor parts.

3. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby; a fan mounted on the ring of said other of said rotor parts; said one bracket having central and peripheral air ventilating openings; and a deflector cone mounted on said one bracket separating said openings and having an open apex located adjacent the turns at one end of the armature winding for guiding air past said end turns.

4. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; and a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby; said other bracket having central and peripheral air ventilating openings; said one rotor part including a spider having arms for inducing flow of air from the central opening of said other bracket to the peripheral opening thereof.

5. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; and a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby; said other bracket having central and peripheral air ventilating openings; said one rotor part including a spider having arms adjacent turns at one end of said armature winding for inducing flow of air from the central opening of said other bracket to the peripheral opening thereof and past said end turns.

6. In a brushless alternator: a substantially cylindrical frame made of magnetic material and having annular polar surfaces at opposite ends; a field coil mounted in the frame and oppositely polarizing the ends of said frame; non-magnetic brackets mounted at the ends of the frame; a stator structure mounted by one of said brackets and extending along the axis of the frame to be surrounded by the frame; said structure having an armature winding, said armature winding having end turns; a two-part rotor structure, each part having a ring and pole arms projecting in an axial direction from the ring; a non-magnetic separating cylinder open at opposite ends; the pole arms of one of said rotor parts fitting the cylinder and received at one of said cylinder ends; the pole arms of the other of said rotor parts fitting the cylinder and received at the other of said cylinder ends; said arms being spaced from each other in the cylinder; the rings of said rotor parts respectively abutting the ends of said cylinder; fasteners detachably securing the rotor parts in assembled relationship and in clamped engagement to the non-magnetic cylinder, said fasteners acting through each ring and the ends of the arms of the companion rotor part; a shaft rotatably supported by the other of said non-magnetic brackets and attached to one of said rotor parts; said rings annularly opposing said frame ends for transfer of flux to said pole arms; said arms being positioned about the stator structure for completion of a magnetic path thereby; a fan mounted on the ring of said other of said rotor parts; said one bracket having central and peripheral air ventilating openings; and a deflector cone mounted on said one bracket separating said openings and having an open apex located adjacent the turns at one end of the armature winding for guiding air past said end turns; said other bracket having central and peripheral air ventilating openings; said one rotor part including a spider having arms adjacent the turns at the other end of the armature winding for inducing flow of air from the central opening of said other bracket to the peripheral opening thereof.

References Cited by the Examiner

UNITED STATES PATENTS

| | | | |
|---|---|---|---|
| 2,928,963 | 3/60 | Bertsche et al. | 310—168 |
| 2,987,637 | 6/61 | Bertsche et al. | 310—168 |
| 3,072,811 | 1/63 | Jaeschke | 310—105 |
| 3,134,039 | 5/64 | Bosch | 310—168 |

MILTON O. HIRSHFIELD, *Primary Examiner.*